Feb. 12, 1929.

J. L. WHEELER 1,701,991

FABRIC MEASURING MACHINE

Filed June 12, 1925     4 Sheets-Sheet 1

Inventor:
John L. Wheeler,
By George A. Pennington
his Atty.

Feb. 12, 1929.

J. L. WHEELER

FABRIC MEASURING MACHINE

Filed June 12, 1925

Patented Feb. 12, 1929.

1,701,991

UNITED STATES PATENT OFFICE.

JOHN L. WHEELER, OF ST. LOUIS, MISSOURI, ASSIGNOR OF ONE-HALF TO SUPERIOR BRASS & MFG. CO., OF ST. LOUIS, MISSOURI, A CORPORATION OF MISSOURI.

FABRIC-MEASURING MACHINE.

Application filed June 12, 1925. Serial No. 36,669.

This invention relates to fabric measuring machines, and more particularly to machines for measuring cloth, tape, ribbon, lace, cord or other flexible fabric. Its principal objects are to produce a simple, compact, economical and durable structure, which is practical and will conveniently measure the goods with accuracy, and at the same time automatically compute the price according to the length measured; to minimize the liability of error in reading the measurement scale, and to co-ordinate with the measurement indicator the price computing device so that it can be conveniently read in conjunction therewith; to produce a novel measurement indicator; to produce a novel construction and arrangement of measuring roll and co-operating presser roll so as to obviate the necessity for providing any special or separate braking device for the measuring roll, and also to prevent damage to the machine or the goods being measured thereon after the measuring and indicating mechanisms have reached the maximum limit of their operative capacity; to improve generally upon machines of this character; and to attain certain advantages as will hereinafter more fully appear in the following description.

The invention consists in the parts, and in the novel combinations and arrangements of parts as hereinafter described and afterwards pointed out with particularity in the appended claims.

In the accompanying drawings forming part of this specification and illustrating a practical adaptation of the invention,—

Figure 7:
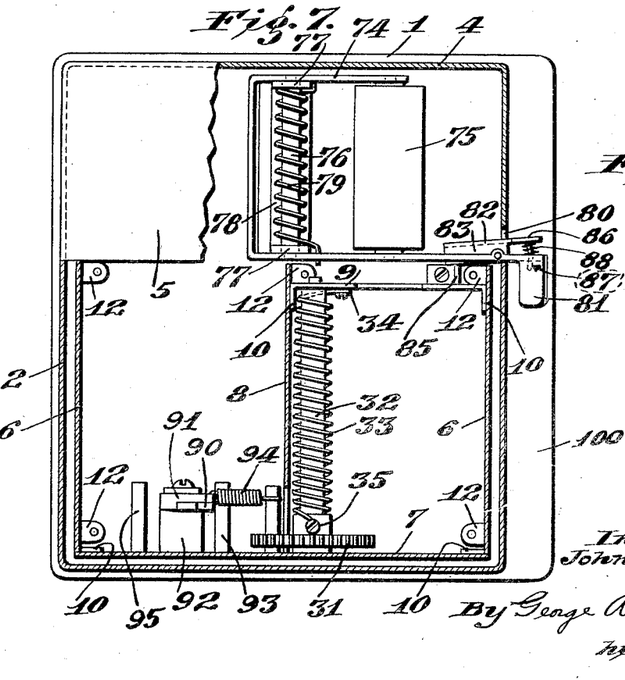
Figure 7 is a view partly in horizontal section on or about the line 7—7 of Figure 2 and partly in top plan, showing the presser roll controlling and manipulating mechanism, the arrangement of the main spring, and the safety stop for the measurment indicator cylinder.
Figure 8:
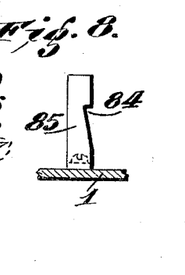
Figure 8 is a detail view of the stop with which the latch member of the presser roll rocking frame engages to hold said frame in lowered position.
Figure 9:
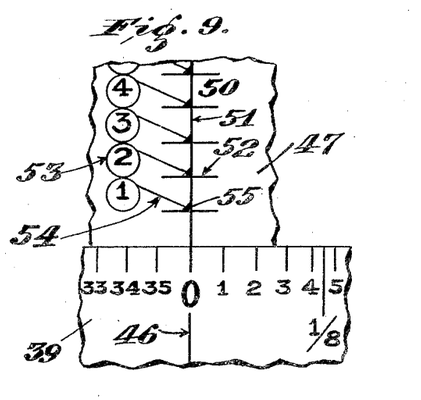
Figures 9, 10, 11 and 12, are respectively schematic views, on an enlarged scale, illustrating the reading of the measurement indicator.
Figure 10:
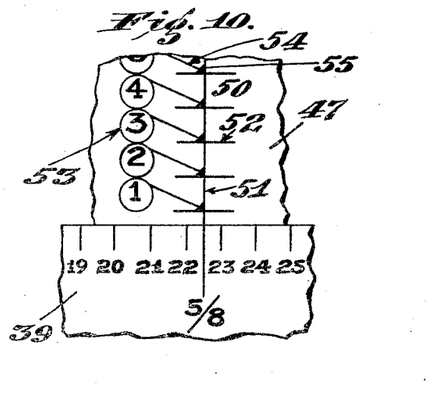

Referring now to the drawings, the numeral 1 designates the base-plate of the machine, and 2 the main case section. At the front of the case is a horizontal slot or mouth 3, which is provided by cutting away the lower portion of the main case section, and below which is a supplemental case section 4, the top plate 5 of which (see Figure 7) affords a table or support for the goods while being run between the measuring roll and presser roll as will be later described.

The frame of the machine may be of any suitable structure, but, preferably, as shown, it comprises side-plates 6, end-plates 7, middle longitudinal plate 8, and an intermediate cross-plate 9, the several plates having ears 10 which are apertured for the reception of screws or rivets 11, at convenient intervals, for securing the said plates together. The plates also have ears at their lower edges, as at 12, for attachment to the base-plate 1.

Mounted on a shaft 13, journalled at its opposite ends in the end-plates 7, as at 14, 15, respectively, is the measuring roll 16. In this connection, it may be here stated that the peripheral measurement of this roll is equal to one-fourth of a yard, or, in other words, nine inches, as this feature is quite material in the present invention.

Figure 3:
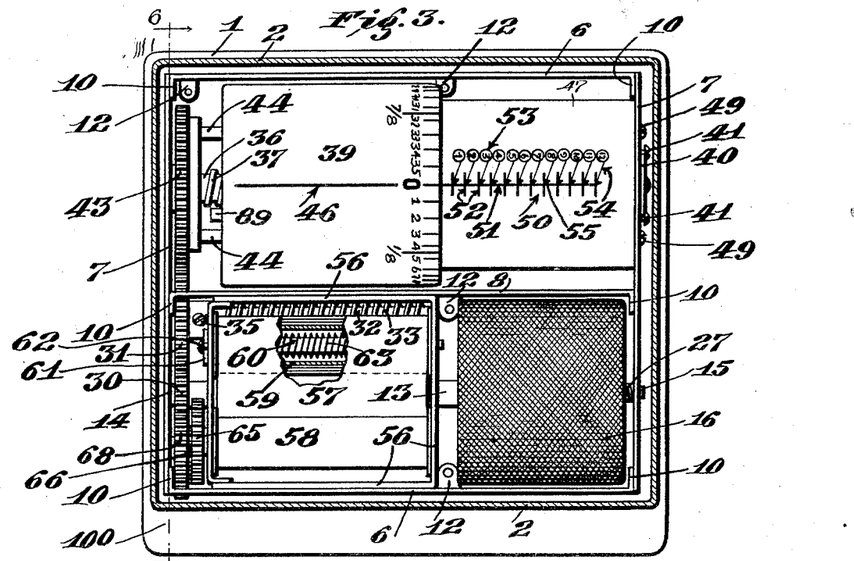
Figure 3 is a view partly in horizontal section through the top portion of the case of the machine on or about the line 3—3 of Figure 2, the exposed mechanism and parts being shown in top plan, and a portion of the computing device being broken away and shown in horizontal section.
Figure 4:
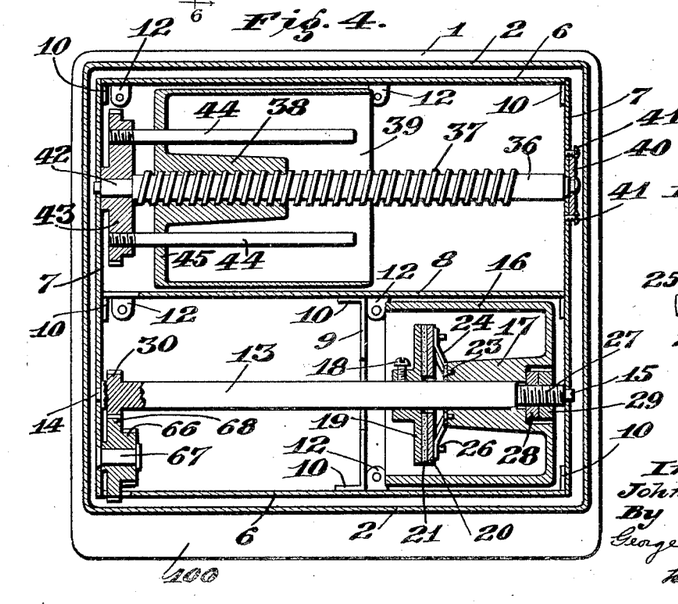
Figure 4 is a horizontal section through the machine on or about the line 4—4 of Figure 2, showing details of the measuring roll and rotatable cylinder of the measurement indicator.
Figure 5:
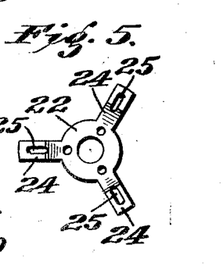
Figure 5 is a detail view of the spring spider used in effecting the tension on the measuring roll.

This roll has its circumferential face preferably knurled throughout (see Figure 3), and it is made hollow, as shown in Figure 4, with a central hub portion 17 having a bore which is fitted rotatably on the shaft 13. Fixed on the shaft 13, as by a set-screw 18, is an abutment collar or flange 19, between which latter and the end of the hub portion 17 of the measuring roll is a loose collar or disk 20. Between the collars 19 and 20 is a fibre or felt washer 21, while interposed between the said collar 20 and the hub 17 is a spider member 22. This spider member has its central portion secured by pins or screws 23 to the hub 17, with its resilient leg portions 24 bearing against the face of the collar 20, said leg portions having slots 25 therein for the engagement with pins 26 projecting from said collar 20.

The forward end portion 27 of the shaft 13 is reduced in diameter and screw-threaded to receive jam nuts 28, 29, which are received in an enlargement of the bore of the hub portion 17 of the measuring roll, said nuts bearing against the end face of the hub 17 and being obviously adjustable to vary the compression of the spring tongues or legs 24 of the spider member 22 in order to secure the desired tension or yieldable pressure on the felt or fibre washer 21 which is interposed between the collars 19 and 20. In this way, the measuring roll 16, under normal conditions in the operation of the machine, turns with the shaft 13, but when an abnormal condition exists, as in case either the shaft or the roll is held against rotation, the other element may be rotated independently thereof. In other words, the effect of the correlated parts with the collars 19 and 20 and washer 21, is that of a friction clutch. Further, by adjusting the collar 19 lengthwise of the shaft 13, obviously the measuring roll may accordingly be adjusted to different positions lengthwise of the shaft should occasion require.

Fixed on or integral with the shaft 13, at its rear end portion, is a small gear or pinion 30 which is in mesh with a gear 31 fixed on a shaft 32. This shaft 32 is journalled at its rear end portion in the end frame member or plate 7, and at its forward end portion in the cross-plate 9, and it is located adjacent to the middle longitudinal frame member or plate 8 (see Figure 7). Coiled around this shaft 32, loosely, is a spring 33, one end of which is secured to the plate 9, as at 34, while its opposite end is secured to the hub of the gear 31, as at 35. This spring may be termed the "main spring" of the machine.

Journalled at its ends in the forward and rear frame plates 7 is a normally stationary and non-rotative shaft 36, which may be termed a "spiral cam shaft" for the reason that it is provided with a screw-thread 37 throughout the major portion of its length and on which the central hub portion 38 of a hollow cylinder 39 works, as will be presently more fully described. This shaft has a circular plate or disk 40 fixed on its forward end portion (see Figures 3 and 4), said disk being engaged at its margin, at diametrically-opposite points, by screws 41 which clamp it to the outer face of the plate 7, whereby said shaft is normally held from rotation, yet by loosening the screws 41 it may be turned, at will, to effect an adjustment of the cylinder 39 lengthwise of the shaft as occasion may require.

The rear end portion 42 of the shaft 36 is reduced in diameter and freely rotatable thereon is a gear 43, said gear being in mesh with the gear 31 on the shaft 32. This gear 43 has a pair of elongated rods or studs 44 projecting inward therefrom at diametrically-opposite points, said rods or studs being slidably fitted through apertures provided therefor in the end wall 45 of the cylinder 39. By this arrangement, when the gear 43 is rotated the cylinder 39 is rotated therewith through the connection afforded by the rods or studs 44, and the cam shaft 36 being stationary the cylinder moves lengthwise of said cam shaft, either forward or backward, according to the direction of rotation of the gear 43 and the cylinder 39.

The cylinder 39, which is an element of the measurement indicator, has a series of peripheral, equally spaced marks or lines, thirty-six of them, representing inches and the total of a yard, and accordingly marked with numerals "0" to "35". Also, at regular intervals, the scale is further marked with distinguishing characters to indicate eighths and quarters and half yard. The numeral "naught" or "zero" character is preferably indicated in larger type than the inch indicating numerals and coincident with this character is a longitudinal line 46.

Figure 6:
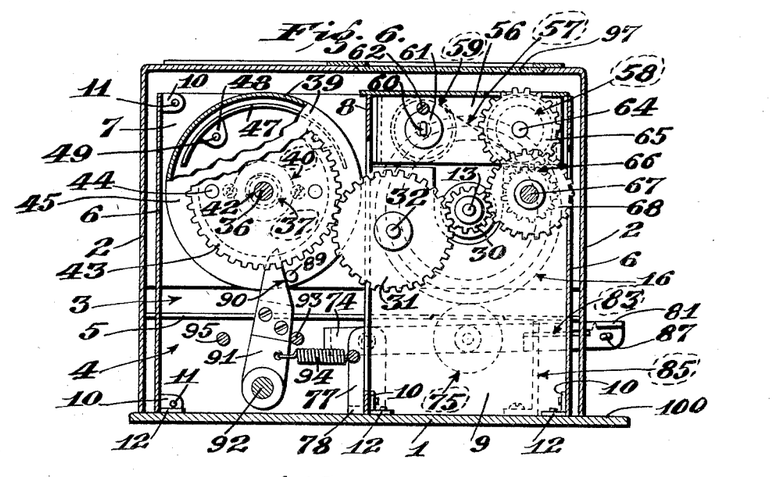
Figure 6 is a vertical section through the back portion of the machine on or about the line 6—6 of Figure 3 illustrating the correlated gearing of the measuring roll, measurement indicator cylinder and price computing device, together with the presser roll parts and the safety stop for the measurement indicator cylinder.

Mounted on the inner face of the forward frame-plate 7 is an arcuate plate 47, said plate having its inner end portion projected within the cylinder 39 just a slight distance, in the normal or unoperated condition of the cylinder, and over which the cylinder travels during the operation of the machine. This plate 47 (see Figure 6) has ears 48 which are perforated and screw-threaded to receive securing screws 49 (see Figure 3) which fasten it to the plate 7.

On the plate 47 is a scale, indicated generally by the numeral 50. This scale comprises a longitudinal line 51 with which the line 46 on the cylinder 39 coincides in reading the measurements effected by the machine. Crossing the line 51 is a series of equally spaced lines 52, twelve of them, representing that many yards and being the capacity of the particular machine illustrated in the drawings. In this connection, however, it may be here stated that this scale may be obviously lengthened or shortened according to the desired capacity of the machine and that the limitation indicated in the drawings is for the purposes of illustration only.

Correlated to the respective cross lines 52 are the numerals "1" to "12", inclusive, said numerals being located within circles 53 which are of a diameter equal to the distance between the respective lines 52, said circles being tangential to each other and being projected directly lateral and coinciding with the spaces between the lines. This scale is shown more clearly in the enlarged views in Figures 9 to 12, inclusive, of the drawings. Preferably, the respective numerals in the circles are of a height just slightly in excess of one-half the diameter of the circles, and they are located well towards the forward sides of the circles. This arrangement is to avoid confusion in reading the scale during the process of measuring. That is to say, as the cylinder 39 moves forward, the numeral being covered thereby remains for a considerable time uncovered in legible state. Extending from the respective cicles 53 to the corners where their respective correlated lines 52 intersect the longitudinal line 51 are diagonal leader lines 54, the respective points of intersection of the three lines above noted being preferably marked by arrow points or the like 55.

Figure 11:
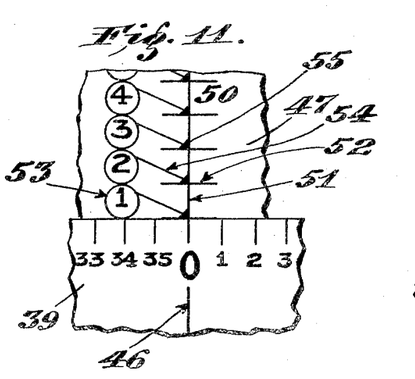
Figure 12:
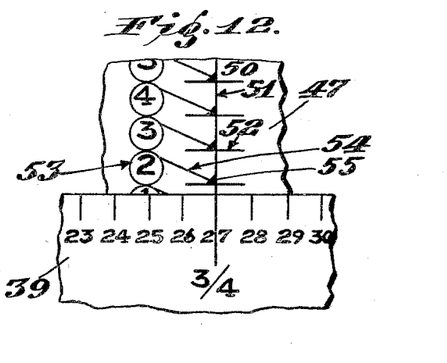

The ratio of the gears 30, 31 and 43 is such that for every four complete revolutions of the measuring roll 16, the measurement indicator cylinder 39 makes one complete revolution. The peripheral measurement of the measuring roll for each complete revolution being one-quarter of a yard, obviously the complete revolution of the cylinder 39 indicates one yard. Therefore, the pitch of the threads 37 on the cam shaft 36 is accordingly such that the cylinder 39 moves forward on the shaft just the distance between two adjacent lines 52 of the scale 50. For example, see Figure 9, which illustrates the normal or zero position of the measurement indicator. Next, by referring to Figure 10, it will be noted that the cylinder 39 has been rotated to bring the mark indicating five-eighths of a yard in register with the line 51 of the scale 50, which gives the measurement that has been effected by the relative rotation of the measuring roll 16. By referring to Figure 11, is will be seen that the cylinder 39 has been rotated one complete turn, thereby bringing the "naught" or "zero" mark into register with the line 51 of the scale 50, and the edge of the cylinder coincident with the first cross line 52, thereby indicating that one yard has been measured off by the roll 16. In this stage, the first circle 53 with its numeral "1" therein is still uncovered. Now by referring to Figure 12, it will be noted that the cylinder 39 has been further rotated three-quarters of the turn, thereby bringing the mark indicating three-quarters of a yard into register with the line 51 of the scale 50, thus indicating that one yard and three-quarters has been measured off by the measuring roll 16. In this stage, the circle 53 is still in partial eclipse and remains so until the cross-line 52 indicating two yards has been reached.

From the foregoing, it will be readily seen that during the operation of the machine, the operator is clearly aware that he is working on the yard, or fraction thereof below or above it, as indicated by the exposed circle 53 next adjacent to the edge of the cylinder 39, and that he is still working on that particular yard or fraction thereof until that circle is completely eclipsed.

Mounted on a supplemental frame 56 which is secured between the middle longitudinal frame-plate 8 and side-plate 6 and rests at its forward end on the cross-plate 9, is a price computing device comprising a flexible strip or tape 57 on both faces of which are the several price computations as will be presently more clearly described. One end portion of this strip 57 is secured to a roll 58 and its opposite end portion is secured to a second roll 59. The roll 59 is rotatable on a shaft 60, which latter is normally stationary or non-rotative on the supplemental frame 56, but is provided at one end with a disk 61, fixed thereto and being clamped to the rear end face of the supplemental frame by a screw 62. Coiled about this shaft 60 is a spring 63, one end which is obviously fixed to the shaft and its opposite end being attached to the roll 59, said spring being constantly under tension and tending to turn the roll 59 so as to wind the said strip 57 thereon and pulling it from the roll 58.

Figure 1:
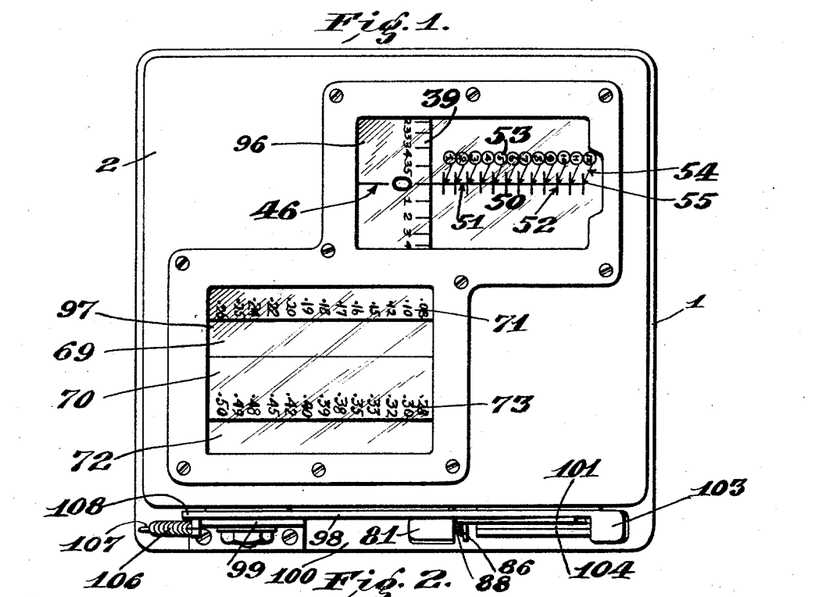
Figure 1 is a top plan view of the encased, complete machine, the several parts of the respective mechanisms of the machine being in normal or unoperated position.

The roll 58 is fixed on a shaft 64 to rotate therewith, and said shaft has a gear 65 fixed thereon which meshes with an intermediate idler gear 66 which is journalled on a stub-shaft or stud 67 on the rear frame-plate 7. The gear 66 has fixed or integral therewith, concentrically, a gear 68 which is in mesh with the pinion 30 on the shaft 13 of the measuring roll 16. By this arrangement of gearing, the roll 58 is rotated proportionately as the measuring roll 16 is rotated and simultaneously and co-ordinately with the measurement indicator cylinder 39. During this operation, the strip 57 is drawn from the roll 59, thereby bringing the computations 57ª (see Figure 13) on the upper face of the strip progressively into view through the sight-opening 69 in the cover-plate 70 (see Figures 1 and 13) of the supplemental frame 56, said computations being read co-ordinately with the respective prices per yard 71 marked on the cover-plate 70 along the margin of the sight-opening 69. It is to be here noted that the strip 57 is wound reversely on the roll 58 in relation to the roll 59, so that the computations 57ᵇ on the under side of the strip are brought into view through the sight-opening 72 in the cover-plate 70 just above the roll 58, said last mentioned computations 57ᵇ being read co-ordinately with the respective prices per yard 73 marked on the cover-plate 70 along the margin of the sight-opening 72.

Figure 13:
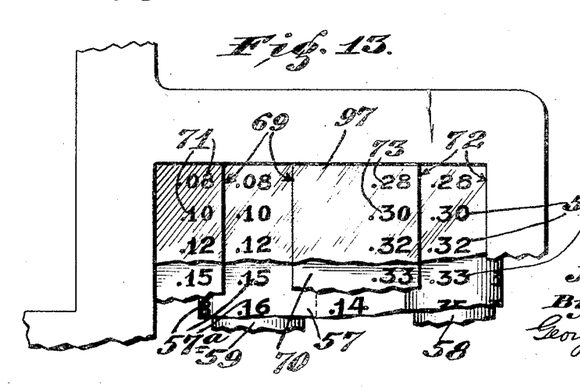
Figure 13 is a schematic view, on an enlarged scale, illustrating the price computing device.

As shown in Figure 13, the illustration indicates that an even yard has been measured on the machine and the price indications are accordingly displayed. In practice, the computations may be made for any desirable fraction of a yard. However, for practical purposes and to limit the length of the strip 57, the computations are for even yards, eighths, quarters and halves, and in nearly all cases goods capable of being measured on the machine are usually sold only on such fractional basis.

Located at the front portion of the machine and under the supplemental case section 4 is a horizontally-hinged yoke or frame 74 in which is journalled a presser roll 75 which is capable of bearing upon the under side of the measuring roll 16. This yoke or frame 74 is pivoted on a shaft 76 mounted on the upstanding arms 77 of an upright yoke 78 fixed on the base-plate 1, and coiled about the shaft 76 is a spring 79, one end portion of which latter is secured to the arm 77 of the upright yoke 78, while its opposite end portion is secured to the adjacent arm of the first mentioned yoke 74, said spring being constantly under tension and tending to lift the yoke 74 and thereby press the presser roll 75 against the measuring roll 16. In order to permit the presser roll 75 to come in contact with the measuring roll 16, the upper plate 5 of the supplemental case section 4 is slotted, of course, to afford ample clearance for the purpose.

Figure 2:
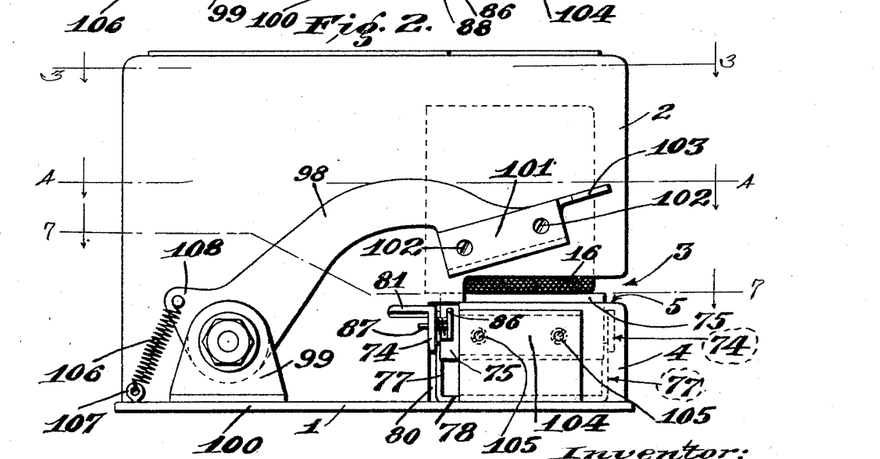
Figure 2 is a side elevation.

One arm of the yoke 74 is extended to the outside of the case through a slot 80 between the main case section 2 and the supplemental case section 4 (see Figure 2) and on its outer end portion is provided with a finger-piece or button 81 for convenience in depressing the yoke when it is desired to move the presser roll 75 out of engagement with the measuring roll. This handle extension is provided with a latch element 82 having a flange portion 83 working through a slot provided therefor in the handle extension and being engageable in a notch 84 in a bracket member 85 fixed on the base-plate 1, so as to releasably hold the yoke 74 in depressed position. The latch member has a finger-piece or button portion 86 with a guide-pin 87 working through an aperture provided therefor in the yoke extension, and sleeved on this guide-pin, between said yoke extension and the finger-piece or button portion 86 is a spring 88 which serves to releasably hold the latch element 82 in contact with the bracket member 85.

The presser roll 75 is of considerably smaller diameter that the measuring roll 16, and by this relation the goods passed between the two rolls in the act of measuring is firmly compressed sufficiently to effect the rotation of the measuring roll as the goods is pulled along; and the larger diameter of the measuring roll, in comparison with the measuring roll of the usual measuring machines of which the present inventor is aware, affords a great leverage which makes for an easy operation of the measurement indicator mechanism and the price computing mechanism. The relative smaller diameter of the presser roll 75 makes its leverage such, that when it is in contact with or pressing against the measuring roll, it serves as a brake to prevent the main spring 33 and the cooperating spring 63 of the computing mechanism from reversing the rotation of the measuring roll when the latter has been brought to rest during a measuring operation. At this point, it may be here stated that the two springs 33 and 63 are normally at a tension to bring the operated measurement indicator mechanism and price computing mechanism back and to yieldably hold them in normal condition. It may be further stated that in the original assembling of the machine the main spring 33 is without tension. The parts being assembled, the measurement roll 16 is turned by hand in the same direction that it is turned in the measuring operation, thereby winding the spring through the gear connections. When the desired tension is attained, the presser roll 75 is allowed to come in contact with the measuring roll 16 which, as above stated, serves as a brake upon the measuring roll. During this operation, of course, the measurement indicator cylinder 39 has been moved forward on the cam shaft 36, but all that is necessary to effect an adjustment of the cylinder back to normal or zero position is to release the disk 40 by loosening the screws 41 and then turning the shaft 36, by which operation the cylinder 39 is moved backward thereon; and when the proper position for the cylinder with respect to the first mark of the scale 50 on the plate 47 has been reached the screws 41 are tightened to clamp the disk 40 to the frame-plate 7. This feature of the invention has the further advantage of changing the tension of the spring 33, at will, as climatic and season changes affect the lubricating oils in the several bearings more or less, but to some extent however, and the tension necessarily may require some change at times.

The tension of the spring 63 of the computing mechanism is changed independently of the main spring 33. This is readily accomplished as the entire mechanism is a separate unit on the supplemental frame 56 which is removable as such unit from the machine. This spring is adjusted, as hereinbefore described, by releasing the screw 62 and turning the disk 61 on the shaft 60 so as to either wind or unwind the spring, as the case may be; and after the desired tension has been attained, the roll 59 may be conveniently held by hand from rotation while the supplemental frame 56 is being replaced, which may be readily accomplished, and when the gear 65 has been engaged with the gear 66 the adjustment is thereby held. At this time, of course, the strip 57 is wound fully on the roll 59, or, in other words, it is in normal or zero condition.

The measurement indicator cylinder 39 is afforded a novel safety zero stop by providing on its rear face a pin or stud 89 which normally engages the edge portion 90 of a yieldable stop element or rock-arm 91 (see Figures 6 and 7), which later is mounted on a stub-shaft or stud 92 secured to the rear frame-plate 7. This yieldable stop element 91 is normally held against a stop-pin 93 projecting inward from the frame-plate 7, by a spring 94. At the opposite side of the member 91 is a limiting stop 95 also projecting from the frame-plate 7.

The overlap of the stud 89 with relation to the stop element 91 is such that, after the cylinder has made one complete revolution in its operative indicating direction, the stud has passed out of the path of said stop element. That is to say, said stud, as the cylinder moves forward on the cam-shaft 36, is moved out of range of said stop element just before the cylinder has completed its first full revolution, and thereafter said cylinder is free to continue rotating without interference of the stop element.

When the presser roll 75 is depressed from engaging relation to the measuring roll 16, and the cylinder 39 is returned to zero position under the power of the main spring 33 and spring 63, the stud 89 comes into contact with the stop element 91, and if there has been developed considerable momentum to the cylinder 39 during this action, an abrupt stop is avoided because the stop element 91 will yield sufficiently to afford a cushion effect, and the spring 94, which is somewhat stronger than the combined strength of the two springs 33 and 63, immediately brings the stop element 91 back to normal position against the stud or stop-pin 93 and shock in this action is counteracted, of course, by said two springs 33 and 63.

Obviously, in the top of the case 2, two sight openings 96 and 97 are provided for the exposure of the measurement indicator and price indicator, respectively, said openings, of course, being provided with glass or other suitable transparent, protective panels.

It is noted that the correlation of these two sight openings is such that the two indications are very conveniently arranged in parallel relation and easily read.

At the side of the case 2, in the direction the goods is passed during the measuring operation, a shear is provided for cutting or notching the goods at the termination of the measured length thereof. As shown, the shear comprises a lever-arm 98 which is hinged on a supporting bracket 99 secured to the laterally projecting portion 100 of the base-plate 1. This lever-arm 98 has a cutting blade 101 attached to its outer face, as by countersunk screws 102, while on the end of the lever-arm is a finger-piece or button portion 103. Mounted on the base-plate 1, in co-operative relation to the shear-blade 101 is the companion shear element 104 having a blade similar to the blade 101 secured on its inner face, as by screws 105. It is thus perfectly obvious that the goods may be sheared by depressing the lever-arm 98, said lever-arm being restored to raised normal position by a spring 106 which is secured at one end to an eye or other suitable fastening 107 to the base-plate 1 and at its opposite end to an extension 108 of the lever-arm.

It is readily apparent that an exceedingly simple and practical machine is produced according to the present invention, which may be conveniently manipulated, assures substantially accurate measurement, and minimizes the liability of error in reading the measurement indications and price computations. Also, the friction clutch connection between the measuring roll and its power shaft which drives the measurement indicator mechanism and price computation mechanism, is such that damage to the mechanism is avoided should any parts become stopped or blocked, or if the measuring roll is rotated in the wrong direction. The general construction and arrangement of the mechanism of the machine is also such that relatively elastic goods, such as laces and the like, may be measured on the machine with reasonable accuracy. That is to say, fabric or goods of this character can be drawn between the measuring roll and presser roll without any appreciable greater degree of stretching or distortion that is liable to occur in measuring by hand.

In the use of the machine it is placed on a counter or table with its forward end portion ahead of the operator. The presser roll 75 is depressed from contact with the measuring roll and the margin of relatively wide goods, or the entire width of relatively narrow goods or ribbon-like strips, as the case may be, is brought through the mouth or horizontal slot 3 in the case and between the measuring roll and presser roll. The end of the goods is placed co-incident with the outer face of the shear-blade 101, and the latch element 82 is released from engagement with the notch 84 of the bracket member 85, whereupon the presser roll 75 is moved upward under the power of the spring 79 and thereby presses the goods in contact with the measuring roll 16. The operator then draws the goods from left to right until the desired measurement is indicated on the measurement indicator scale 50. This being accomplished, the shear member 98 is depressed thereby severing or notching the goods. After the price computation has been duly noted in the sight-opening 69 or 72, as the case may be, the presser roll is depressed and the remainder of the goods removed from the machine. When the pressure of the presser roll 75 is relieved from the measuring roll 16, the several parts of the respective mechanisms of the machine are restored to normal position under the power of the springs 33 and 63 as hereinbefore described.

In addition to the feature, hereinbefore set forth, of having the price computation mechanism as a separate and detachable unit in the machine for the purpose of adjusting the tension of the spring 63, there is a further and important advantage in the separable unit arrangement, in that units having different price computations may be interchanged in the machine at will, without disturbing the other mechanisms. Hence, should the prices in a particular department be changed, as sometimes occurs in the course of business, the case may be readily removed from the machine and the price computation unit removed and another placed in lieu thereof. The same is true in case the machine is transferred to a different department.

Obviously, the entire machine admits of considerable modification without in the least departing from the spirit and scope of the invention as defined by the appended claims. Therefore, it is not limited to the specific construction and arrangement shown in the accompanying drawings.

What is claimed is:

1. In a fabric measuring machine, an indicator mechanism comprising a cam shaft, a hollow cylinder having a central hub portion rotatable and movable endwise on said cam shaft, means in gear connection with a power device for effecting the operation of said cylinder on said cam shaft proportionately to the length of the goods measured, a stationary indicator element co-ordinated with said cylinder and about which said cylinder travels in its operation, said cylinder having a scale marked circumferentially at its forward marginal portion, and said stationary element having a longitudinally disposed scale marked thereon and in conjunction with which the said circumferential scale on said cylinder co-operates to indicate the length of the goods measured, and means for restoring said indicator mechanism to normal zero condition.

2. In a fabric measuring machine, a measurement indicator device comprising a rotatable and endwise movable, hollow cylinder, and a stationary element of arcuate cross-section extending substantially concentric with and longitudinally in advance of said cylinder and over which said cylinder travels, said cylinder having an annular scale on its circumference, at its forward margin, said scale indicating fractions of a prescribed unit of linear measure, and said stationary element having a longitudinal scale on its circumferential face, said scale comprising a longitudinal line intersected by equally spaced transverse lines, the distance between the respective transverse lines indicating the length of the prescribed unit of measure.

3. In a fabric measuring machine, a measurement indicator device comprising a rotatable and endwise movable, hollow cylinder, and a stationary element of arcuate cross-section extending substantially concentric with and longitudinally in advance of said cylinder and over which said cylinder travels, said cylinder having an annular scale on its circumference, at its forward margin, said scale indicating one yard for each complete revolution of the cylinder and fractions of a yard on partial rotation thereof, and said stationary element having a longitudinal scale on its circumferential face, said scale comprising a longitudinal line coinciding with the zero line of said scale on said cylinder, in the normal unoperated condition of the latter, a series of equally spaced transverse lines intersecting said longitudinal line, the distance between the respective transverse lines corresponding to the distance said cylinder moves endwise during each complete revolution thereof and accordingly indicating the length of one yard.

4. A measurement indicating device, as set forth in claim 3, and further including: said stationary element having thereon a series of indicative characters progressively numbered in sequence from and including "1" up to and including the numeral corresponding to the maximum capacity of the device, said indicative characters being projected laterally from said longitudinal line of said longitudinal scale and coincidently with the spaces between the respective transverse lines thereof.

5. A measurement indicator comprising a rotatable and endwise movable, hollow cylinder, and a stationary element correlated to said cylinder in concentric relation and over which said cylinder travels endwise during its rotation, said stationary member having a longitudinal scale on its peripheral face, said scale comprising a longitudinal line, a series of equally spaced transverse lines intersecting said longitudinal line, the distance between the respective transverse lines corresponding to the distance said cylinder moves endwise during each complete revolution thereof and indicating the length of a prescribed unit of linear measure, and said cylinder having on its forward circumferential margin an annular scale indicating the prescribed unit of measure for each complete revolution of the cylinder and fractions of said unit of measure on partial rotation thereof, the zero mark of said annular scale coinciding with the longitudinal line of said first mentioned scale in the normal unoperated condition of the cylinder and at the termination of each complete revolution thereof.

6. A measurement indicator comprising a rotatable and endwise movable, hollow cylinder, and a stationary element juxtaposed in longitudinally co-operative relation to said cylinder and having a longitudinal scale on its face, over which said cylinder travels, said scale comprising a longitudinal line, a series of equally spaced transverse lines intersecting said longitudinal line, the distance between the respective transverse lines corresponding to the distance said cylinder moves endwise during each complete revolution thereof and indicating the length of a prescribed unit of linear measure, an indicative series of frames projected laterally from said longitudinal line, coincidently with the respective spaces between the transverse lines, said frames being tangential to each other in a parallel row with respect to said longitudinal line and having respectively marked therein the corresponding numbers of the spaces sequentially from "1" to that of the maximum capacity of the device.

7. In a measurement indicator, as set forth in claim 6, and further comprising a series of leader lines extending from the forward portions of said frames to their correlated transverse lines and to the respective corners where said transverse lines intersect said longitudinal line.

8. A measurement indicator comprising a rotatable and endwise movable, hollow cylinder, and a stationary element juxtaposed in longitudinally co-operative relation to said cylinder and having a longitudinal scale on its face, over which said cylinder travels, said scale comprising a longitudinal line, a series of equally spaced transverse lines intersecting said longitudinal line, the distance between the respective transverse lines corresponding to the distance said cylinder travels endwise during each complete revolution thereof and indicating the length of a prescribed unit of linear measure, an indicative series of marked circles arranged tangentially to each other and in a parallel row with respect to said longitudinal line, said circles being respectively projected laterally from said longitudinal line and coincidently with the spaces between said transverse lines and having marked therein the corresponding numbers of the respective spaces sequentially from "1" to that of the maximum capacity of the device, and a series of diagonal leader lines extending substantially tangential from the upper portions of the respective circles to their correlated transverse lines and to the respective corners where said transverse lines intersect said longitudinal line.

9. In a fabric measuring machine, a measurement indicator comprising a normally stationary cam shaft having a screw thread thereon, a hollow cylinder having a central hub portion threaded on said cam shaft, a gear rotatable freely in fixed longitudinal position about said cam shaft, means slidably connecting said gear and said cylinder whereby to effect the rotation of said cylinder and at the same time permit its endwise movement on said cam shaft, and actuating means operable by the movement of the goods being measured for driving said gear, said actuating means including a train of gears connecting said first mentioned gear whereby to effect an automatic and synchronous rotation of the latter.

10. A fabric measuring machine, as set forth in claim 9, and further comprising a spring element incorporated in said actuating means and acting to normally hold said cylinder yieldably in starting position and to restore it to such position when relieved from the power of said actuating means.

11. In a fabric measuring machine, an indicator device comprising a rotatable and endwise movable cylinder, spring-returned means for operating said cylinder, and means for positioning said cylinder in its normal condition comprising a stud projecting from the rear end of the cylinder, and a spring-retracted member normally engaged by said stud but from the range of which said stud passes just prior to the completion of the first revolution of said cylinder upon its operation from normal position, the spring power of said spring-retracted member being in excess of that of said spring-returned means for operating said cylinder.

12. In a fabric measuring machine, an indicator cylinder, means for effecting a simultaneous rotation and endwise movement of said cylinder, a spring for restoring said cylinder to normal position, and means for yieldably stopping said cylinder at normal position comprising a stud projecting from the end of the cylinder, a rock-arm swingable transversely of said cylinder whereby to be engaged by said stud, a limiting stop for said rock-arm in its normal position, a second stop at the opposite side of said rock-arm, and a spring for yieldably holding said rock-arm against said first mentioned limiting stop, said spring being of power in excess of that of the spring for restoring said cylinder to normal position.

13. In a measuring device of the character described, a rotary and endwise movable measurement-indicating element, a stud on the end of said measurement-indicating element, a limiting stop element releasably engaged by said stud in the normal starting position of said measurement-indicating element, means for simultaneously rotating and moving said measurement-indicating element endwise from starting position and out of engagement with said limiting stop before the first complete rotation of said measurement-indicating element, and means for returning said measurement-indicating element to starting position with reverse rotary and endwise movement and into engagement with said limiting stop at the completion of final rotation of said measurement-indicating element.

14. In a machine for measuring the length of fabric, a rotary and endwise movable measurement-indicating element, a yieldable stop element releasably engaged by said measurement-indicating element in the normal starting position of the latter, means actuated by the movement of the fabric being measured for rotating said measurement-indicating element, cooperating means for moving said measurement-indicating element endwise from starting position and out of engaging range from said stop element during its rotation, and cooperating means energized during the said actuation of said measurement-indicating element and re-acting to reverse the operation of said other two mentioned actuating means for returning said measurement-indicating element to starting position and engagement with said stop element.

15. In a measuring device of the character described, an indicating element simultaneously rotatable and axially movable from starting position, mechanism for actuating said element and moving it from starting position, said mechanism including a spring that is wound during such actuation and reacting to restore said element to starting position, and means for restoring said indicator element to starting position independently of said actuating mechanism after operation therefrom.

16. In a measuring device of the character described, a rotatable and endwise movable indicator element, means for simultaneously rotating and moving said indicator element endwise from starting position, a spring element cooperating with said indicator element moving means whereby to be energized during the forcible operation of the latter in moving said indicator element from starting position and reacting to reversely operate said indicator element moving means to return said indicator element to starting position, and means for returning said indicator element from actuated to starting position free of the action of said spring element and without reaction of said means which moved it from starting position.

17. A machine for measuring the length of fabric, comprising a rotary element having a circumferentially extending scale thereon, a cooperating element extending parallel with the axis of said rotary element and having a longitudinal scale thereon in correlation to the scale on said rotary element, one of said elements being movable endwise and means actuated by the movement of the fabric being measured for automatically effecting the simultaneous rotation of said rotary element and a relative endwise movement between it and said cooperating element.

18. A machine for measuring the length of fabric, comprising a rotary and endwise movable element having a circumferentially extending scale thereon, a relatively stationary element having a scale extending lengthwise of the axis of the rotary element and in correlation to the scale on said rotary element, and means actuated by the movement of the fabric being measured for automatically rotating said rotary element and simultaneously moving it endwise as it is rotated.

19. A machine for measuring the length of fabric, comprising a rotary and endwise movable element having an annular scale on its circumferential end portion, said scale being divided to indicate fractions of a unit of linear measure, a relatively stationary element having a longitudinal scale thereon parallel with the axis of said rotary element, said longitudinal scale being divided to indicate the respective full units as fractionized by the divisions of said annular scale on said rotary element and functioning correlatively therewith, and means through which the fabric is passed linearly to be measured, said means being operably connected with said rotary element whereby to automatically and synchronously rotate the latter and simultaneously move it endwise, and said rotary element, as it moves from starting position, gradually covering and concealing the scale on said stationary element.

20. A machine for measuring the length of fabric, comprising a rotary and endwise movable element having a circumferentially extending scale thereon, said scale being divided to indicate fractions of a unit of linear measure, a relatively stationary element having a scale extending lengthwise of the axis of said rotary element, said last mentioned scale being divided to indicate the respective full units as fractionized by the divisions of said scale on said rotary element, means through which the fabric is passed linearly to be measured, said means being operably connected with said rotary element whereby the latter is automatically rotated and simultaneously moved endwise from starting position and throughout the measuring operation upon the fabric, said rotary element gradually covering and concealing the scale on said stationary element during such actuation, and means for automatically returning said rotary element to starting position when relieved of the power of said means which actuates it from such position.

21. A machine for measuring the length of fabric, comprising a rotary element having a circumferentially extending scale thereon, a cooperative element having a scale thereon, one of said elements being movable endwise, and means actuated by the movement of the fabric being measured for automatically effecting the simultaneous rotation of said rotary element and a relative endwise movement between it and said cooperative element.

JOHN L. WHEELER.